(12) United States Patent
Basel et al.

(10) Patent No.: US 10,810,513 B2
(45) Date of Patent: Oct. 20, 2020

(54) ITERATIVE CLUSTERING FOR MACHINE LEARNING MODEL BUILDING

(71) Applicant: SparkCognition, Inc., Austin, TX (US)

(72) Inventors: Tek Basel, Austin, TX (US); Kevin Gullikson, Pflugerville, TX (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/171,182

(22) Filed: Oct. 25, 2018

(65) Prior Publication Data

US 2020/0134510 A1 Apr. 30, 2020

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC .............................. G06N 20/00; G06F 16/825
See application file for complete search history.

(56) References Cited

U.S. PATENT DOCUMENTS

| | | | |
|---|---|---|---|
| 9,082,018 B1* | 7/2015 | Laska | G06K 9/00711 |
| 9,110,984 B1* | 8/2015 | Lewis | G06F 16/355 |
| 9,122,956 B1* | 9/2015 | Fink | G06K 9/6232 |
| 2017/0024641 A1* | 1/2017 | Wierzynski | G06N 3/0454 |
| 2017/0132307 A1* | 5/2017 | Xiao | G06F 16/285 |
| 2017/0300828 A1* | 10/2017 | Feng | G06N 20/00 |
| 2017/0308801 A1* | 10/2017 | Cai | G05B 23/0229 |
| 2017/0357909 A1* | 12/2017 | Willamowski | G06F 16/93 |
| 2018/0150036 A1* | 5/2018 | Xu | G05B 13/0265 |
| 2018/0268319 A1* | 9/2018 | Guo | G06N 5/04 |
| 2018/0285347 A1* | 10/2018 | Mizobuchi | G06F 17/277 |
| 2018/0322436 A1* | 11/2018 | Sotiroudas | G06F 17/5009 |
| 2019/0152011 A1* | 5/2019 | Kummari | G06N 20/00 |
| 2019/0164054 A1* | 5/2019 | Lee | G06N 20/00 |
| 2019/0362021 A1* | 11/2019 | Balduino | G06F 40/30 |

* cited by examiner

*Primary Examiner* — Kamran Afshar
*Assistant Examiner* — Ryan C Vaughn
(74) *Attorney, Agent, or Firm* — Moore IP Law

(57) ABSTRACT

A method includes performing a first clustering operation to group members of a first data set into a first group of clusters and associating each cluster of the first group of clusters with a corresponding label of a first group of labels. The method includes performing a second clustering operation to group members of a combined data set into a second group of clusters. The combined data set includes a second data set and at least a portion of the first data set. The method includes associating one or more clusters of the second group of clusters with a corresponding label of the first group of labels and generating training data based on a second group of labels and the combined data set. The method includes training a machine learning classifier based on the training data to provide labels to a third data set.

16 Claims, 6 Drawing Sheets

ITERATIVE CLUSTERING FOR MACHINE LEARNING MODEL BUILDING

BACKGROUND

Classification tasks are one type of task that can be performed using machine learning. In classification tasks, each member of a data set is assigned to one of a number of different groups or classes. Some classification tasks can be performed using supervised learning and others can be performed using unsupervised learning. Supervised learning is useful when groups or classes among which data are to be divided are known in advance. For example, supervised learning can be used to develop a machine learning classifier to evaluate a real-time data stream and to assign each data point of the data stream to one of a number of predetermined classes. Developing a machine learning classifier using supervised learning techniques relies on use of a set of training data for which group membership is known in advance. In the supervised learning context, the training data are often referred to as labeled training data or supervised training data.

Unsupervised learning can be used when the set of groups or classes into which the data are to be grouped are not known in advance. In contrast to supervised learning, unsupervised learning does not rely on access to labeled training data. Rather, an unsupervised learning technique can be used to determine groupings of data points, using an unlabeled data set, based on similarities or patterns in the data set. One example of an unsupervised environment is a type of machine learning referred to as "clustering."

SUMMARY

The present disclosure describes systems and methods that use unsupervised learning and supervised learning cooperatively to generate and update a machine learning classifier. In a particular implementation, a set of unlabeled data is analyzed using clustering operations to identify clusters, where each cluster corresponds to a particular state or condition represented in the data. The data of the set are labeled, to generate labeled training data, based on the clusters. In some circumstances, the data are labeled based on human input and expertise. To illustrate, an expert can be consulted to identify the state or condition represented by the data points in each cluster, and the label assigned to the cluster by the expert is associated with each data point in the cluster. Thus, if the expert indicates that a first cluster includes data representing (or gathered during) a first normal operating state of a device, each data point in the first cluster is labeled "first normal operating state". The labeled data resulting from the clustering and labeling operations is used as supervised training data to generate a machine learning classifier.

After the machine learning classifier is trained, it can be used to classify data that is subsequently received or analyzed (i.e., different data than the original unsupervised training data). To illustrate, the original unsupervised training data may have been collected during a first time period, and the machine learning classifier can be used to classify data collected during a second time period that is subsequent to the first time period.

In some circumstances, the original unsupervised training data may not include data corresponding to every possible state or condition of the system that generated the data. To illustrate, if the data include sensor data from monitoring a machine, the machine may not experience all of its normal operational states and fault states in the time period during which the original unsupervised training data are gathered. As another illustrative example, data representing a normal operational state of the machine can drift overtime due to mechanical wear, normal sensor drift, etc. In this example, data that would not be representative of a particular normal operational state in the time period during which the original unsupervised training data are gathered may later be representative of the particular normal operational state. Accordingly, in this example, to accurately classify operational states of machine over time, the machine learning classifier should be updated occasionally.

It can be very expensive, time consuming, and labor intensive to update the machine learning classifier. For example, following the steps above, an expert is required to label every cluster each time the machine learning classifier is updated because the supervised training data used to update the machine learning classifier are derived from the expert labeled clusters. Cluster and label mapping techniques described herein can be used to reduce the time, expense, and labor involved with updating the machine learning classifier.

In a particular implementation, the cluster and label mapping techniques described herein map labels assigned based on a first clustering operation to clusters generated during a second clustering operation. The first clustering operation and the second clustering operation are performed on different (though possibly overlapping) data sets. For example, the first clustering operation can be performed using a first data set that represents a system or machine during a first time period, and the second clustering operation can be performed using a second data set that represents the system or machine during a second time period that is subsequent to the first time period. The second data set can include more dataor fewer data than the first data set. In some implementations, the second data set includes the entire first data set. In other implementations, the second data set includes a subset or portion of the first data set.

Because the data sets include different data, the first clustering operation and the second clustering operation can identify different clusters (or different cluster boundaries). Further, many clustering techniques use randomized operations, e.g., to select an initial number of cluster centers or to designate initial cluster centers, which can also result in differences between clusters identified by the first clustering operation and clusters identified by the second clustering operation. The cluster and label mapping techniques described herein identify commonalities between clusters from the first clustering operation and clusters from the second clustering operation to map the labels assigned based on the first clustering operation to corresponding clusters from the second clustering operation. The commonalities identified can include, for example, common data points, similar relative positions in a cluster space, or other similar features, as described further below. Thus, the cluster and label mapping techniques described herein simplify the process of updating the machine learning classifier by preserving information across clustering operations.

DETAILED DESCRIPTION

Figure 1A:
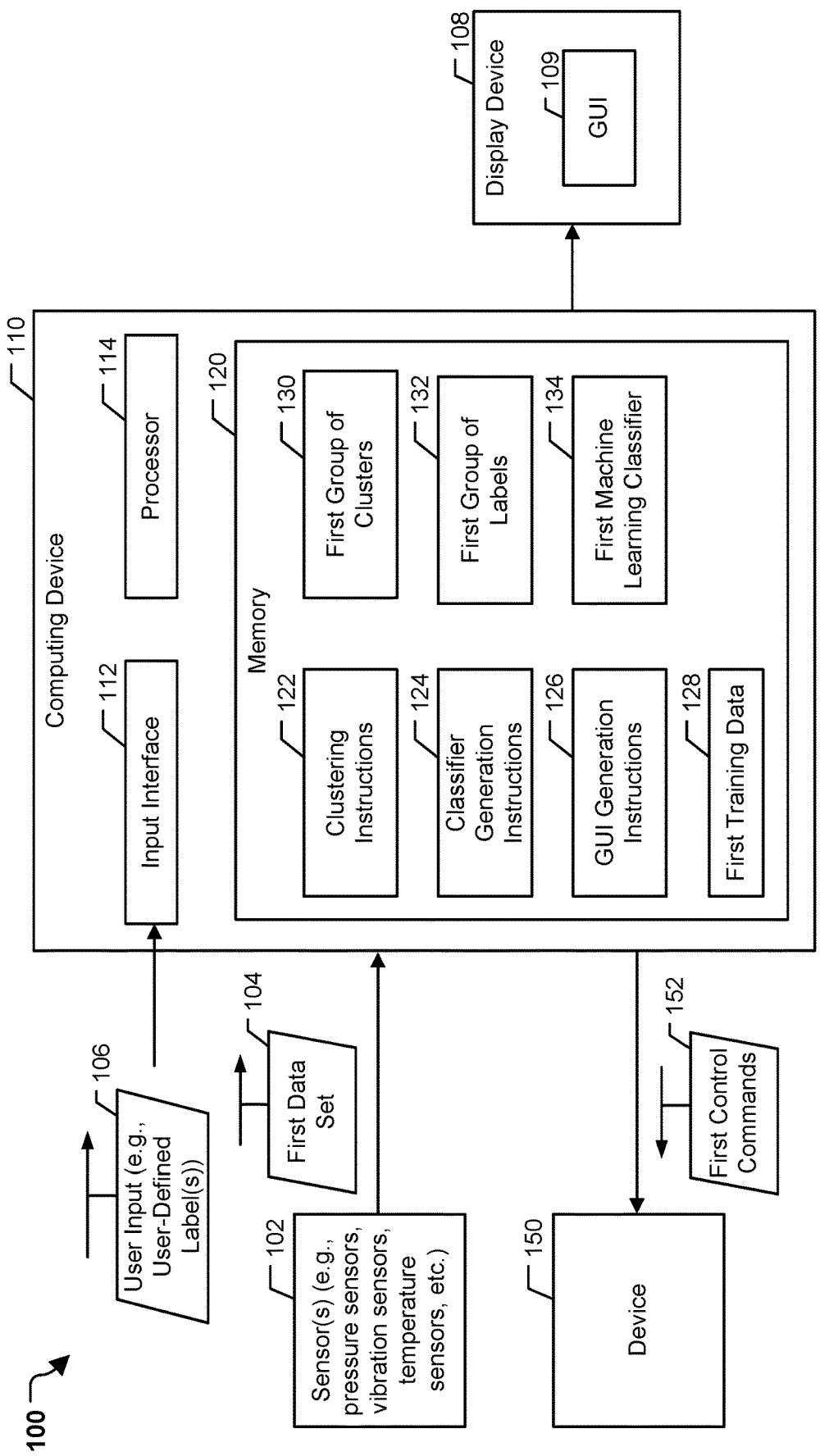
FIGS. 1A and 1B illustrate particular implementations of a system that is operable to perform multiple clustering operations and to generate machine learning classifiers.
Figure 1B:
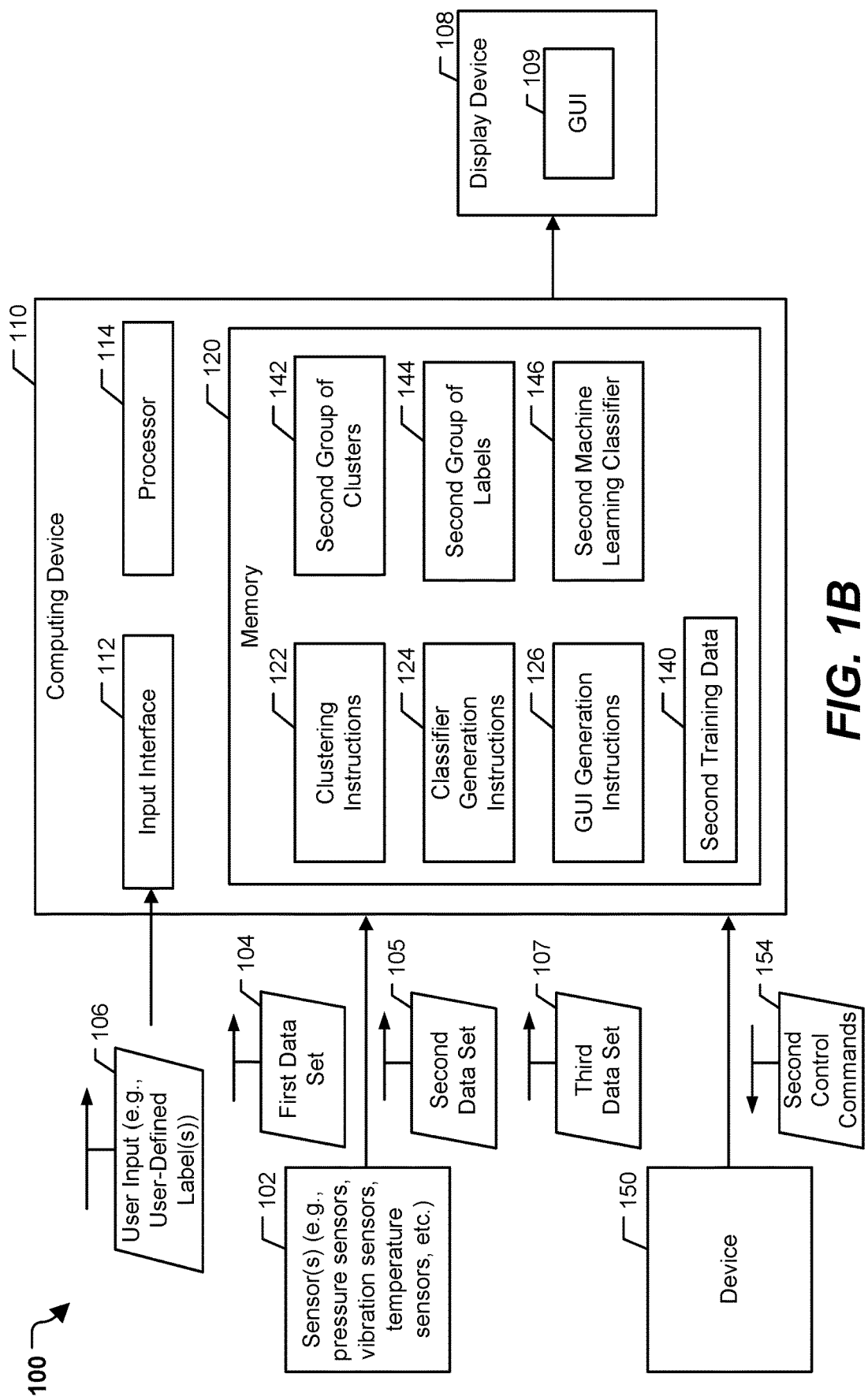

Referring to FIGS. 1A and 1B, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes one or more sensors 102, a computing device 110, a display device 108, and a device 150.

It is to be understood that operations described herein as being performed by the various instructions or by a machine learning classifier may be performed by a device executing instructions or the machine learning classifier. In some implementations, the clustering operations and the classifier generation operations are performed on a different device, processor (e.g., central processor unit (CPU), graphics processing unit (GPU) or other type of processor), processor core, and/or thread (e.g., hardware or software thread) than the machine learning classifier. Moreover, execution of certain operations associated with the clustering operations, the classifier generation operations, the graphical user interface (GUI) generation operations, or the trained classifier may be parallelized, as further described herein.

The system 100 may operate to iteratively generate and train (or retrain) a machine learning classifier based on input data. FIG. 1A corresponds to an example of the system 100 training a first machine learning classifier and using the first machine learning classifier to monitor and control the device 150, and FIG. 1B corresponds to an example of the system 100 training (or retraining) a second machine learning classifier and using the second machine learning classifier to monitor and control the device 150.

The sensors 102 are configured to generate time-series sensor data. In some implementations, the sensors 102 are coupled to the device (e.g., a machine) and configured to generate sensor readings (e.g., measurements) associated with the device 150. As a particular example, the sensors 102 include one or more vibration sensors configured to generate vibration measurements. As another particular example, the sensors 102 include one or more pressure sensors configured to generate pressure measurements. As yet another particular example, the sensors 102 include one or more temperature sensors configured to generate temperature measurements. As another example, the sensors 102 include mixed sensors (e.g., temperature and pressure sensors) configured to generate multiple types of measurements. Such examples are for illustration only, and in other implementations, the sensors 102 include other types of sensors. The device 150 includes a turbine, a compressor, an engine, a motor, a generator, another type of machine or device, or a combination thereof. Although described as a single device, in other implementations, the device 150 includes multiple devices. For example, the device 150 can be one piece of equipment in a processing system, such as an oil extraction or refining process.

In a particular implementation, the computing device 110 is configured to receive a first data set 104 of the time-series data (e.g., the sensor data) from the sensors 102. For example, the time-series data may be received in real-time or near real-time from the sensors 102, and the first data set 104 includes data corresponding to a first time period. As used herein, sensor data received in real-time or near real-time refers to sensor data that are generated during the operation of the device (e.g., the device monitored by the sensors 102) and received from the sensors after any processing is performed. For example, the sensors 102 generate the sensor data and passes (or processes and passes) the sensor data to the computing device 110.

The computing device 110 includes an input interface 112, a processor 114, and a memory 120. In some implementations, the input interface 112 and the memory 120 are coupled to the processor 114, such as via a bus. The input interface 112 is configured to receive user input from one or more users. For example, the input interface 112 may include a keyboard, a touchscreen, a mouse, a voice-command interface, a gesture-command interface, or a combination thereof. The processor 114 may be a single processor or may include one or more processors, one or more central processing units (CPUs), one or more graphics processing units (GPUs), one or more controllers, or a combination thereof, that are configured to execute instructions stored at the memory 120 to perform the operations described herein.

The memory 120 is configured to store instructions and data to enable the processor 114 to perform the operations herein. The memory 120 may include a random-access memory (RAM), a read-only memory (ROM), a computer-readable storage device, an enterprise storage device, any other type of memory, or a combination thereof. In the illustrated example, the memory 120 is configured to store clustering instructions 122, classifier generation instructions 124, graphical user interface (GUI) generation instructions 126, first training data 128, a first group of clusters 130 (e.g., data indicative of the first group of clusters 130), a first group of labels 132, and a first machine learning classifier 134 (e.g., data indicative of the first machine learning classifier 134).

The clustering instructions 122 are configured to perform clustering operations using input data, such as the first data set 104, as further described herein. For example, the clustering instructions 122 may group members (also referred to herein as data points) of the first data set 104 into the first group of clusters 130. The clustering instructions 122 also associate clusters with corresponding labels. For example, the first group of clusters 130 are associated with the first group of labels 132, as further described herein.

In some implementations, several sensors 102 are associated with the device 150 such that for each time period, the first data set 104 includes multiple sensor data points. To illustrate, the sensor(s) 102 can include a temperature sensor and a tachometer, each of which generates a corresponding sensed value periodically or occasionally to generate time-series data including a temperature value and a revolutions per minute (RPM) value for each time period. In such implementations, the time-series data can be grouped into vectors with each vector including a plurality of sensed data values for a particular time period. To illustrate, in the example above, the first data set 104 can include a first data vector including a first temperature value and a first RPM value for a first time period, and the first data set 104 can include a second data vector including a second temperature value and a second RPM value for a second time period. Although two sensors 102 are used in this example, in other implementations, each vector can include more than two sensed data values. Further, because the sensors 102 can generate data at different rates and some sensed data values can be lost, corrupted, or unreliable, data pre-processing operations can be performed to fill in some values, to assign data values to time periods, or to perform other operations to generate the vectors of data for each time period.

The classifier generation instructions 124 are configured to generate a machine learning classifier, such as the first machine learning classifier 134, based on training data, such as the first training data 128, as further described herein. As used herein, generating a machine learning classifier may include training a machine learning classifier based on training data and storing data indicative of the machine learning classifier, such as at the memory 120.

The GUI generation instructions 126 are configured to generate a GUI 109 for display to the user, as further described herein. For example, the GUI 109 may display information indicative of the grouping of input data into clusters, prompts for a user to provide labels to one or more clusters, identification of operating states of a device, other information, or a combination thereof, as further described herein.

The computing device 110 is also coupled to a display device 108. The display device 108 includes any device capable of displaying information to a user, such as a monitor, a liquid crystal display (LCD) screen, a touch screen, another type of display device, or a combination thereof. Although illustrated as a separate component, in other implementations, the display device 108 is included in or integrated within the computing device 110. The display device 108 is configured to display the GUI 109, as further described herein.

During operation, the sensors 102 perform measurements of the device 150 to generate the time-series data (e.g., the sensor data). The device 150 may include or correspond to industrial machinery, such as a turbine, a compressor, an engine, another type of machinery, or another type of device. The time-series data (e.g., the sensor data) may include vibration measurements, pressure measurements, temperature measurements, other measurements, or a combination thereof. Further, the time-series data can include multiple measurements (or sensed values) for each time segment, such as both a temperature measurement and a pressure measurement for each minute of the time series.

The computing device 110 receives the first data set 104 of the time-series data (e.g., the sensor data) from the sensors 102 or from another computing device that is coupled to the sensors 102 (e.g., via a network, via direct transmission, etc.). The first data set 104 corresponds to data recorded or generated during a first time period. The clustering instructions 122 receive the first data set 104 as an input and perform first clustering operations on the first data set 104 to group the members of the first data set 104 into the first group of clusters 130. The first clustering operations may be any type of clustering operations, including centroid clustering operations (such as K-Means clustering), hierarchical clustering operations, mean-shift clustering operations, connectivity clustering operations, density clustering operations (such as density-based spatial clustering applications with noise (DBSCAN)), distribution clustering operations, expectation-maximization (EM) clustering using Gaussian mixture models (GMM), or other types of clustering operations or algorithms.

As an example of K-Means clustering, each member of the first data set 104 may be mapped into a feature space. The feature space includes a plurality of dimensions, with each dimension corresponding to a particular feature of the input data. For example, the time-series data may include multiple types of sensor readings during each sample period, and each type of sensor reading may correspond to a dimension in the feature space. In some implementations, the feature space may be two dimensional, with one dimension corresponding to a particular measurement value (e.g., a pressure measurement, a vibration measurement, a temperature measurement, etc.) and another dimension corresponding to time. In other implementations, the feature space may include more than two dimensions or include different dimensions.

The clustering instructions 122 are configured to group the members of the first data set 104 (e.g., data points of the first data set 104) into clusters based on the notion that a distance between two points in the feature space is generally indicative of similarity between two members of the first data set 104. To begin the K-Means clustering operation, a particular number of initial locations (e.g., cluster centers) in the feature space are selected. A distance between a member (e.g., data point) and a particular cluster center is determined. The distance between a particular data point and a cluster center (or another data point) may be determined as a Euclidean distance, as a non-limiting example. The data point is added to a nearest cluster based on the distance between the data point and each cluster center (which may be an initial position if the cluster does not include any data points). In some implementations, if a data point is remote from every cluster (e.g., the distance between the data point and each cluster center is greater than a threshold distance), the data point is identified as an anomaly and is not assigned to any cluster. After a data point is added to a cluster, a new cluster center is determined as a center of each data point assigned to the cluster. Each additional data point of the first data set 104 is similarly assigned to a corresponding one of the first group of clusters 130. In other implementations, clustering may be performed based on a different attribute, such as connectivity, density, distributions, etc., and in some implementations, initial conditions for the clusters are not set prior to performing the clustering operations.

In an example, the computing device 110 is configured to identify the first group of clusters using unsupervised learning to assign members of the first data set 104 to the first group of clusters 130. The clusters are determined based on relationships or patterns within the time-series data. After determining the assignment of the members of the first data set 104 to the first group of clusters 130, the clustering instructions 122 are configured to associate each cluster of the first group of clusters 130 with a corresponding label of the first group of labels 132.

In a particular implementation, the first group of labels 132 initially includes system-generated labels. For example, there may be N clusters, and the first group of labels 132 includes "Cluster A," "Cluster B," "Cluster C," and "Cluster N". After the initial cluster labels are generated, the computing device 110 is configured to display information regarding the clusters to the user to enable the user to define the first group of labels 132. For example, the display device 108 may be configured to display (e.g., via the GUI 109) a prompt for one or more user-defined labels corresponding to the first group of labels 132, and the input interface 112 may be configured to receive a user input 106 indicating the one or more user-defined labels. To further illustrate, the GUI generation instructions 126 are configured to cause generation of the GUI 109 where the GUI 109 displays an identification of at least some of the data points that are in a first cluster and a prompt for the user to enter a label for the first cluster. The GUI 109 similarly displays information and prompts for each of the other clusters, enabling the user to label each of the clusters. In a particular implementation, the user labels the clusters with operating states of the device 150, such as "Operating State 1", "Operating State 2", "Operating State 3", and "Operating State N." Thus, the first group of labels 132 may correspond to operating states of the device 150.

After assigning the members of the first data set 104 to the first group of clusters 130 and associating the first group of clusters 130 with the first group of labels 132, the processor 114 may execute the classifier generation instructions 124 to generate and train the first machine learning classifier 134. The first machine learning classifier 134 includes any type of trained classifier, such as a neural network classifier, a decision tree classifier, a support vector machine classifier, a regression classifier, a naive Bayes classifier, a perceptron classifier, or another type of classifier. To generate the first machine learning classifier 134, the classifier generation instructions 124 are configured to generate the first training data 128 including the first data set 104 and the first group of labels 132. For example, each data point of the first data set 104 is associated with a corresponding label (e.g., a cluster label of the cluster to which the data point belongs) of the first group of labels 132, and the labeled data are used as the first training data 128.

The classifier generation instructions 124 are further configured to train the first machine learning classifier 134 based on the first training data 128. After the first machine learning classifier 134 is trained, the first machine learning classifier 134 is configured to provide labels based on unlabeled input data. For example, real-time, time-series data from the sensors 102 may be provided to the first machine learning classifier 134, and the first machine learning classifier 134 may output one or more labels associated with the real-time time-series data. The labels generated by the first machine learning classifier 134 may be used in determining labels assigned by another machine learning classifier (or a re-trained machine learning classifier) as further described herein.

In a particular implementation, training the first machine learning classifier 134 includes training the first machine learning classifier 134 to detect an operating state of the device 150 based on real-time, time-series data. In this implementation, the first machine learning classifier 134 is further configured to generate an output indicating a user-defined label describing the operating state. For example, the first machine learning classifier 134 outputs one or more labels based on the real-time, time-series data. The operating states may be labeled or described by a user, such as via the user input 106 indicating one or more user defined labels for the clusters. In some implementations, the first machine learning classifier 134 can also, or in the alternative, label operating states that may be associated with an imminent fault condition. For example, if the device 150 entered a fault condition while the first data set 104 was being gathered, the user may be able to label some of the data points as associated with or indicative of the fault state. In this example, the first training data 128 may include sufficient information to train the first machine learning classifier 134 to predict that the device 150 will soon enter the fault state based on the real-time, time-series data.

In a particular implementation, the first machine learning classifier 134 is executed by the computing device 110, and output of the first machine learning classifier 134 is provided as input to the GUI generation instructions 126. The GUI generation instructions 126 are configured to generate the GUI 109 for display at the display device 108. The GUI 109 may indicate the labels output by the first machine learning classifier 134 based on the real-time, time-series data. For example, the GUI 109 may display the operating states of the device 150 for each of a plurality of time periods (e.g., sample times corresponding to the real-time, time-series data).

Additionally, the device 150 may be controlled based on the labels of the real-time, time-series data. To illustrate, the processor 114 may generate first control commands 152 to cause the device 150 to perform operations based on the labels output by the first machine learning classifier 134. For example, if the first machine learning classifier 134 outputs a particular label (e.g., of an operating state that is a precursor to a fault state), the processor 114 generates the first control commands 152 to cause the device 150 to change operating states (e.g., to an operating state that is less likely to precede a fault state) or to change a configuration of the device 150. Thus, the first machine learning classifier 134 may be configured to output labels of operating states to be used to control the device 150.

Moving on to FIG. 1B, at a particular time, the computing device 110 generates a new machine learning classifier (e.g., updates the first machine learning classifier 134). The generation of the new machine learning classifier may occur after a particular amount of time has lapsed, after a particular amount of the time-series data has been received, after a particular number of a specific label has been output by the first machine learning classifier 134, or at some other time. In some implementations, generation of the new machine learning classifier may be responsive to a change associated with the device 150. For example, the device 150 may undergo maintenance, a new component may be added, a component may be removed, or another change may occur that substantially changes (or is expected to change) the sensor data generated by the sensors 102. Additionally, or alternatively, the sensors 102 may undergo "sensor drift" such that measurements recorded by the sensors 102 are on average different from during the first time period associated with the first data set 104. To compensate for these changes to the device 150 or to the sensors 102, the computing device 110 generates a new machine learning classifier. The new machine learning classifier is based on the previous sensor data as well as new sensor data.

To illustrate, the computing device 110 receives a second data set 105 of the time-series data. The second data set 105 corresponds to a second time period that is subsequent to the first time period associated with the first data set 104. In addition to being used to generate the new machine learning classifier, the second data set 105 can be collected and analyzed, in real-time, by the first machine learning classifier 134 of FIG. 1A to provide an indication of the state of the device 150 to a user.

For purposes of generating the new machine learning classifier, the computing device 110 combines the second data set 105 with at least a portion of the first data set 104 to generate a combined data set. In a particular implementation, the combined data set includes the second data set 105 and an entirety of the first data set 104. In another implementation, only a portion of the first data set 104 is included in the combined data set. For example, a sliding window may be used to determine the portion of the first data set 104 to be included in the combined data set. In another particular implementation, data associated with particular clusters are included in the combined data set. In other implementations, other portions of the first data set 104 are included in the combined data set.

The clustering instructions 122 are configured to perform second clustering operations on the combined data set to group members (e.g., data points) of the combined data set into a second group of clusters 142. For example, members of the combined data set (e.g., the second data set 105 and a portion of the first data set 104) are grouped into various clusters in a feature space, similar to the clustering operations performed to group the first data set 104 into the first group of clusters 130. In some implementations, the second group of clusters 142 includes one or more of the clusters that corresponds to clusters of the first group of clusters 130. For example, the first group of clusters 130 and the second group of clusters 142 may both include one or more clusters having the same characteristics. Alternatively, the second group of clusters 142 may include clusters having different characteristics than the first group of clusters 130.

After performing the second clustering operations, the second group of clusters 142 is associated with a second group of labels 144. For example, the clustering instructions 122 are configured to associate each cluster of the second group of clusters 142 with a corresponding label of the second group of labels 144.

The second group of labels 144 includes one or more labels of the first group of labels 132 such that one or more clusters of the second group of clusters 142 are associated with corresponding labels of the first group of labels 132. For example, in the first group of clusters 130, there may be a first cluster that corresponds to the label "Operating State A," and the clustering instructions 122 may determine that a second cluster in the second group of clusters 142 also corresponds to the label "Operating State A." Thus, a first cluster of the first group of clusters 130 and a second cluster of the second group of clusters 142 may both be associated with a first label of the first group of labels 132 even though one or more characteristics of the first cluster are different from one or more characteristics of the second cluster.

The clustering instructions 122 determine that the first cluster and the second cluster correspond to the same label based on characteristics of the first cluster and the second cluster. For example, the clustering instructions 122 may determine that the first cluster and the second cluster correspond to the same label based on the first cluster and the second cluster including the same one or more data points (e.g., members of the first data set 104). As another example, the clustering instructions 122 may determine that the first cluster and the second cluster correspond to the same label based on a characteristic, such as a center location, quantity of members, distribution, or another characteristic of the first cluster being within a corresponding threshold of a characteristic of the second cluster. Other characteristics of the first cluster and the second cluster may be different. Determining that two clusters correspond to the same label is further described with reference to FIG. 2.

Assigning labels from the first group of labels 132 to the second group of clusters 142 enables the system 100 to retain knowledge of the device 150 based on historical data (e.g., the first data set 104). To illustrate, past operating states may continue to be identified even though the input data have changed sufficiently to cause one or more of the clusters to change characteristics. Retaining the past knowledge (e.g., of previous operating states) enables the system 100 to continue identifying the same operating states even after the input data have changed instead of generating newly labeled operating states when the input data have changed. For example, based on the first clustering operation, a first cluster of the first group of clusters 130 may be labeled "Operating State A." The first cluster includes data point 1, data point 2, and data point 3, in addition to other data points. During the second clustering operation, a second cluster of the second group of clusters 142 is identified. The second cluster includes data point 1, data point 2, and data point 3, in addition to other data points. However, the second cluster has at least one characteristic that is different from the first cluster. For example, a location of a cluster center of the second cluster may be different from a location of a cluster center of the first cluster, a distribution associated with the second cluster may be different from a distribution associated with the first cluster, the number of data points included in the second cluster may be different from a number of data points included in the first cluster, or another characteristic may be different. Because the first cluster and the second cluster each include data point 1, data point 2, and data point 3, the clustering instructions 122 determine that the second cluster corresponds to the first cluster (regardless of the other different characteristics), and the clustering instructions 122 associate the second cluster with the label associated with the first cluster (e.g., "Operating State A"). Thus, clusters having different characteristics can be identified as corresponding to previously identified clusters, thereby enabling the system 100 to retain information about clusters as machine learning classifiers are iteratively generated (or updated). The remaining clusters of the second group of clusters 142 are labeled based on user-defined labels. For example, the GUI 109 may include prompts to a user to label any of the clusters that are not associated with a label from the first group of labels 132, as these may represent new operating states of the device 150.

After associating the second group of clusters 142 with the second group of labels 144, second training data 140 are generated. For example, the classifier generation instructions 124 are configured to generate the second training data 140 including the second group of labels 144 and the combined data set (e.g., the combination of the second data set 105 and the portion of the first data set 104). The classifier generation instructions 124 use the second training data 140 to generate and train a second machine learning classifier 146. For example, the second training data 140 may be provided to the second machine learning classifier 146 during a training process of the second machine learning classifier 146. Although described as generating the second machine learning classifier 146, in other implementations, the first machine learning classifier 134 may be retrained to generate the second machine learning classifier 146.

The second machine learning classifier 146 is configured to provide labels to a third data set 107 of the time-series data (e.g., the sensor data) associated with a third time period that is subsequent to the second time period. For example, after the second machine learning classifier 146 is trained, the second machine learning classifier 146 outputs labels based on real-time, time-series data. The labels are from the second group of labels 144 (which includes one or more labels of the first group of labels 132). In a particular implementation, the second machine learning classifier 146 is configured to detect an operating state of the device 150 based on real-time, time-series data. The operating state is identified by a label output by the second machine learning classifier 146.

The GUI generation instructions 126 are configured to generate the GUI 109 for display at the display device 108. The GUI 109 may include a prompt for a label of a new cluster that is included in the second group of clusters 142. For example, the display device 108 may be configured to display a prompt for one or more user-defined labels corresponding to the second group of labels 144. The one or more user-defined labels may be indicated by the user input 106.

For example, the input interface 112 is configured to receive the user input 106 indicating the one or more user-defined labels.

Additionally, or alternatively, output of the second machine learning classifier 146 is output via the GUI 109. For example, the GUI 109 may display the labels corresponding to the third data set 107 that are output by execution of the second machine learning classifier 146. In a particular implementation, the labels include labels indicating operating states of the device 150. Alternatively, the second machine learning classifier 146 may be executed at a different device, or the output generated by the second machine learning classifier 146 may be displayed at a display device of a different device. For example, the computing device 110 may be a cloud computing device that is accessed by a second device communicatively coupled (e.g., via a network, such as the Internet) to the cloud computing device, and the output of the second machine learning classifier 146 may be displayed on a display device of the second computing device.

In some implementations, the device 150 is controlled based on the labels of the real-time, time-series data (e.g., the third data set 107). To illustrate, the processor 114 may generate second control commands 154 to cause the device 150 to perform operations based on the labels output by the second machine learning classifier 146. For example, if the second machine learning classifier 146 outputs a particular label (e.g., of an operating state that is a precursor to a fault state), the processor 114 generates the second control commands 154 to cause the device 150 to change operating states (e.g., to an operating state that is less likely to precede a fault state) or to change a configuration of the device 150. Thus, the second machine learning classifier 146 may be configured to output labels of operating states to be used to control the device 150.

By generating the second machine learning classifier 146, the system 100 is able to adapt to an evolving device while still retaining information learned from historical data. For example, the device 150 may exhibit new operating behaviors over time (e.g., due to maintenance, parts changes, wear, or other changes to the device 150). Additionally, or alternatively, sensor readings may change over time due to sensor drift. Due to the new behaviors or changes in sensor readings, a particular machine learning classifier may become outdated and may begin to identify anomalies (e.g., data points that cannot be assigned a label with sufficient certainty) with increasing frequency. Such identifications are false positives, and the increased false positive rate degrades the utility of the particular machine learning classifier. However, because the system 100 periodically generates a new machine learning classifier, the new behaviors and sensor drift are accounted for. Additionally, the new machine learning classifier identifies at least some of the same operating states as previous classifiers, thereby retaining a correspondence between existing historical data and newly received data, and reducing time and expense associated with user labeling of data. In this manner, the system 100 periodically generates machine learning classifiers that have reduced false positive rates while retaining information learned from historical data. Such machine learning classifiers have greater utility than other machine learning classifiers that become outdated (e.g., do not take into account changes to the device and thus have higher false positive rates) or that do not retain information learned from historical data. Additionally, the machine learning classifiers generated by the system 100 can be used to control the device 150, such as to avoid unintended operating states or operating states that are precursors to fault states, thereby reducing an amount of downtime of the device 150 for repairs.

Figure 2:
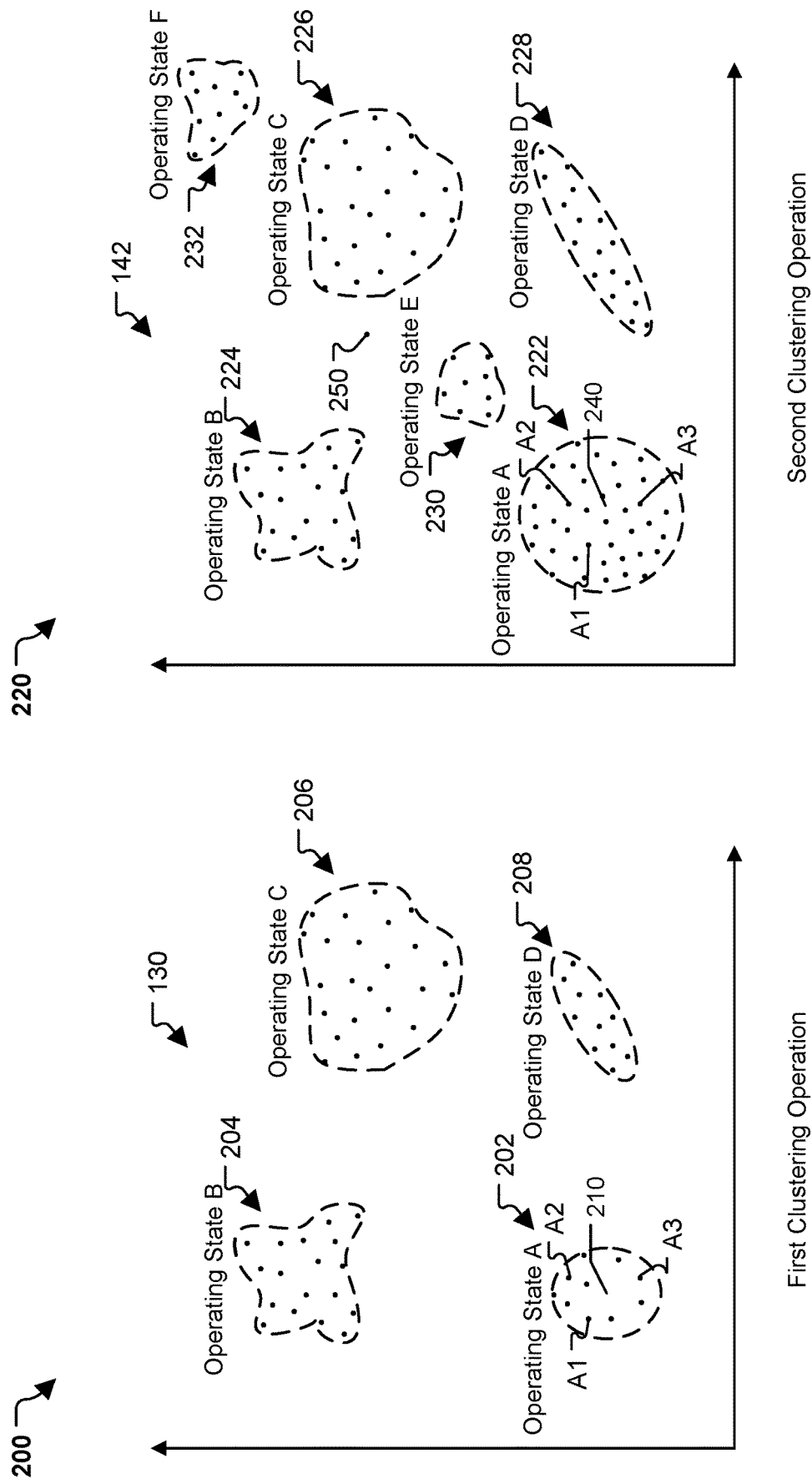
FIG. 2 illustrates particular clustering operations in accordance with one or more aspects disclosed herein.

Referring to FIG. 2, particular illustrative examples of clustering operations are shown. In FIG. 2, the x and y axes represent two dimensions of a feature space into which time-series data are transformed. In other implementations, the feature space includes more than two dimensions. For example, the feature space may be n dimensional, where n is the number of different types of time-series data that are being clustered. In a particular implementation, first clustering operations 200 are performed on the first data set 104 of FIG. 1A, and second clustering operations 220 are performed on the combined data set (e.g., the second data set 105 of FIG. 1B and at least a portion of the first data set 104).

The first clustering operations 200 are performed on the first data set 104 to group the data points (e.g., members of the first data set 104) into various clusters. For example, the data points of the first data set 104 are grouped into the first group of clusters 130. In the example illustrated in FIG. 2, the first group of clusters 130 includes four clusters. In other examples, the first group of clusters 130 includes fewer than four or more than four clusters.

In a particular implementation, the clusters 202-208 are determined using K-Means clustering operations. To illustrate, a number of clusters is determined, and a cluster center for each of the clusters is initially set. In a particular implementation, the number of clusters is determined based on a number of operating states of a device (e.g., the device 150 of FIGS. 1A and 1B). After initializing each of the cluster centers in the feature space, data points are added to the various clusters and locations of the cluster centers are modified. For example, in response to determining that a particular data point A1 is closer to the center of the first cluster 202 than to the center of any other cluster 204-208, the particular data point A1 is added to the first cluster 202, and the location of the center of the first cluster 202 is modified (e.g., updated) to be between the location of the initial cluster center and the location of the particular data point A1. Additional points may be added to the clusters 202-208 in a similar manner. For example, another particular data point may be added to the second cluster 204 based on the other particular data point being closer to the cluster center of the second cluster 204 than to the center of any other cluster 202, 206, 208, and the location of the cluster center of the second cluster 204 may be updated based on the location of the other particular data point. In some implementations, a data point is only added to a cluster if the data point is within a threshold distance of the cluster center; otherwise, the data point is maintained as an outlier. In a particular implementation, outliers are identified as anomalies (e.g., data points that are not representative of an operating state) or are identified as corresponding to a fault state. In other implementations, one or more of the operating states corresponding to the clusters 202-208 may correspond to fault states, or precursors to fault states. The first clustering operations 200 continue until all data points (e.g., of the first data set 104) are assigned to a corresponding cluster or are identified as outliers, and the locations of the cluster centers are updated based on the assignments. For example, after performance of the first clustering operations 200, the data points are grouped into the clusters 202-208, as illustrated in FIG. 2. Although K-Means clustering operations have been described, in other implementations, the first clustering operations 200 include other types of clustering operations or algorithms, such as hierarchical clustering, mean-shift clustering, connectivity clustering operations, density clustering operations (such as DBSCAN), distribution clustering operations, EM clustering using GMM, or other types of clustering operations or algorithms.

Each of the clusters is associated with a label. For example, a first cluster 202 is associated with the label "Operating State A," a second cluster 204 is associated with the label "Operating State B," a third cluster 206 is associated with the label "Operating State C," and a fourth cluster 208 is associated with the label "Operating State D." In some implementations, outliers may also be identified by a label, such as "Anomaly" or "Fault State." In some implementations, one or more of "Operating State A," "Operating State B," "Operating State C," or "Operating State D" may correspond to a fault state. In the example illustrated in FIG. 2, these four labels make up the first group of labels 132 of FIG. 1A. In some implementations, the labels are determined by the computing device 110. Alternatively, one or more of the labels may be user-defined. For example, the user input 106 of FIGS. 1A and 1B may indicate the names of the labels for the clusters 202-208.

A machine learning classifier, such as the first machine learning classifier 134 of FIG. 1A, is trained based on supervised training data that include the labels corresponding to the clusters 202-208 and the first data set 104. For example, the first data set 104 and the corresponding labels (e.g., the cluster label of each data point in the first data set 104) may be provided as the first training data 128, as described with reference to FIG. 1A. This machine learning classifier is configured to receive input data and to output a label, such as one of "Operating State A", "Operating State B," "Operating State C," "Operating State D", or "Anomaly," based on the input data. In this context, an anomaly refers to a data point that does not correspond, with sufficient confidence, to a class or label that the machine learning classifier is trained to identify. At a later time, due to changes in the device 150 or sensor drift, data points of input data may begin to fall outside the clusters 202-208, leading to increased identification of anomalous data. Many of these anomalous data identifications may be false positives, and thus the usefulness of the first machine learning classifier 134 may deteriorate as time progresses. For example, due to sensor drift, a sensor value gathered during a normal operating condition (e.g., Operating State A) may deviate sufficiently from other data points associated with the normal operating condition that the machine learning classifier is not able to reliably label the sensor value as indicative of any recognized operating condition. In this situation, the sensor value is indicative of a normal operating condition, but because of the sensor drift, the machine learning classifier is not able to properly label the sensor data.

To compensate for changes in the device 150 or the sensor data, the second clustering operations 220 are performed. The second clustering operations 220 are performed as part of the process to generate a new machine learning classifier, such as the second machine learning classifier 146 (also referred to as updating the first machine learning classifier 134). As described with reference to FIG. 1B, the second clustering operations 220 are performed on a combined data set (e.g., a combination of the second data set 105 and at least a portion of the first data set 104). In the example illustrated in FIG. 2, the combined data set includes an entirety of the first data set 104. In other implementations, the combined data set includes less than an entirety of the first data set 104.

The second clustering operations 220 are performed to group the data points of the combined data set into the second group of clusters 142 of FIG. 1B. In the example illustrated in FIG. 2, the second group of clusters 142 includes a fifth cluster 222, a sixth cluster 224, a seventh cluster 226, an eighth cluster 228, a ninth cluster 230, and a tenth cluster 232. Additionally, in FIG. 2, a particular data point 250 is identified as an outlier. For example, if the second clustering operations 220 include K-Means clustering operations, the particular data point 250 is identified as an outlier based on there being no cluster center that is located within a threshold distance of the location of the particular data point 250 in the feature space. In other implementations, other types of clustering operations may be used.

Each of the clusters 222-232 is associated with a label. The labels associated with the clusters 222-232 make up the second group of labels 144. At least some of the labels for the clusters 222-232 are the same as labels of the clusters 202-208 (e.g., the second group of labels 144 includes at least some labels of the first group of labels 132). A cluster of the first group of clusters 130 may have the same label as a cluster of the second group of clusters 142 even though one or more characteristics of the clusters differ. To illustrate, the first cluster 202 is associated with a first label (e.g., "Operating State A"), the fifth cluster 222 is associated with the first label, and a characteristic of the first cluster 202 is different from a characteristic of the fifth cluster 222. For example, a location of a cluster center, a quantity of members, a distribution, or another characteristic may be different between the first cluster 202 and the fifth cluster 222.

Association of clusters with labels from previous clusters is performed based on a correspondence between the clusters. For example, a particular characteristic (e.g., a common characteristic) of the first cluster 202 and the fifth cluster 222 may be the same, and thus the two clusters are associated with the same label. In a particular implementation, the common characteristic is the inclusion of a particular set of data points. To illustrate, the first label ("Operating State A") is associated with the first cluster 202, and the first cluster 202 includes the data points A1, A2, and A3. In this implementation, the first label is also associated with the fifth cluster 222 based on the fifth cluster 222 including the data points A1, A2, A3. Thus, even though other characteristics of the fifth cluster 222 are different from those of the first cluster 202, the two clusters correspond to each other and are associated with the same label. For example, even though the location of a cluster center 210 of the first cluster 202 is different from the location of a cluster center 240 of the fifth cluster 222 and a quantity of data points included in the first cluster 202 is different from a quantity of data points included in the fifth cluster 222, the first cluster 202 and the fifth cluster 222 are both associated with the label "Operating State A."

Additionally, or alternatively, two clusters may be associated with the same label if at least one characteristic (e.g., a common characteristic) of one cluster is similar to the characteristic of another cluster. For example, if a characteristic of the second cluster is within a threshold similarity to a characteristic of the first cluster, the second cluster is associated with the same label as the first cluster. In a particular implementation, the characteristic includes a location of a cluster center. To illustrate, the first label ("Operating State A") is associated with the first cluster 202 and the first cluster 202 has the cluster center 210 located at a first location (e.g., a center location) in the feature space. In this implementation, the first label is also associated with the fifth cluster 222 based on the location in the feature space of the cluster center 240 of the fifth cluster 222 being within a threshold distance of the location of the cluster center 210 of the first cluster 202. As a non-limiting example, this implementation may be used for centroid clustering operations.

In another particular implementation, the characteristic includes a quantity of members (e.g., data points). To illustrate, the first label is associated with the first cluster 202 and the first cluster 202 includes a first quantity of members (e.g., a total number of data points included in the first cluster 202). In this implementation, the first label is also associated with the fifth cluster 222 based on a difference between the first quantity and a second quantity of members included in the fifth cluster 222 satisfying a threshold (e.g., being less than or equal to the threshold).

In another particular implementation, the characteristic includes a cluster distribution. To illustrate, the first label is associated with the first cluster 202 and the first cluster 202 is associated with a first distribution. In this implementation, the first label is also associated with the fifth cluster 222 based on a difference between the first distribution and a second distribution associated with the fifth cluster 222 satisfying a threshold (e.g., being less than or equal to the threshold). For example, a mean or a standard deviation associated with the fifth cluster 222 may be within a threshold of a mean or a standard deviation associated with the first cluster 202. As a non-limiting example, this implementation may be used for distribution clustering operations.

In another particular implementation, the characteristic includes a cluster density. To illustrate, the first label is associated with the first cluster 202 and the first cluster 202 has a first density. In this implementation, the first label is also associated with the fifth cluster 222 based on a difference between the first density and a second density associated with the fifth cluster 222 satisfying a threshold (e.g., being less than or equal to the threshold). As a non-limiting example, this implementation may be used for density clustering operations, such as DBSCAN.

Based on similarities between the clusters 222-232 and the clusters 202-208, at least some of the clusters 222-232 are associated with labels of the clusters 202-208. In the example illustrated in FIG. 2, the fifth cluster 222 is associated with the first label (e.g., "Operating State A") based on the fifth cluster 222 including a set of members (e.g., data points) that are also included in the first cluster 202. To illustrate, both the first cluster 202 and the fifth cluster 222 include the data points A1, A2, and A3. The set of data points may be specifically chosen (e.g., the data points are particular representative data points or other selected data points) or the set of data points may be chosen randomly or pseudo-randomly. The sixth cluster 224 is associated with the second label (e.g., "Operating State B") based on multiple similarities (e.g., inclusion of a set of data points, location of cluster center, cluster boundary, etc.) with the second cluster 204. The seventh cluster 226 is associated with the third label (e.g., "Operating State C") based on multiple similarities (e.g., inclusion of a set of data, location of cluster center, cluster boundary, etc.) with the third cluster 206. The eighth cluster 228 is associated with the fourth label (e.g., "Operating State D") based on the eighth cluster 228 including a set of data points that are also included in the fourth cluster 208. Because the ninth cluster 230 and the tenth cluster 232 are not sufficiently similar to any of the clusters 202-208, the ninth cluster 230 is associated with a fifth label (e.g., "Operating State E") and the tenth cluster is associated with a sixth label (e.g., "Operating State F"). The new labels (e.g., the fifth label and the sixth label) may correspond to new operating states that are associated with a time period associated with the second data set 105 or may correspond to fault states. Additionally, in implementations in which outliers are identified, the particular data point 250 is identified as anomalous (which may correspond to a fault state).

Because at least some of the second group of clusters (e.g., clusters 222-232) are associated with labels that are also associated with the first group of clusters (e.g., clusters 202-208), the information (e.g., the labeled operating states) associated with earlier time periods is maintained when generating a new machine learning classifier (e.g., the second machine learning classifier 146). By associating at least some new clusters with labels of previous clusters, changing behavior patterns of complex assets can be learned by a machine learning classifier while retaining information (e.g., indicative of operating states) learned from historical data. This improves the utility of the machine learning classifier by reducing false positives of outliers (e.g., fault states) as time goes on.

Figure 3:
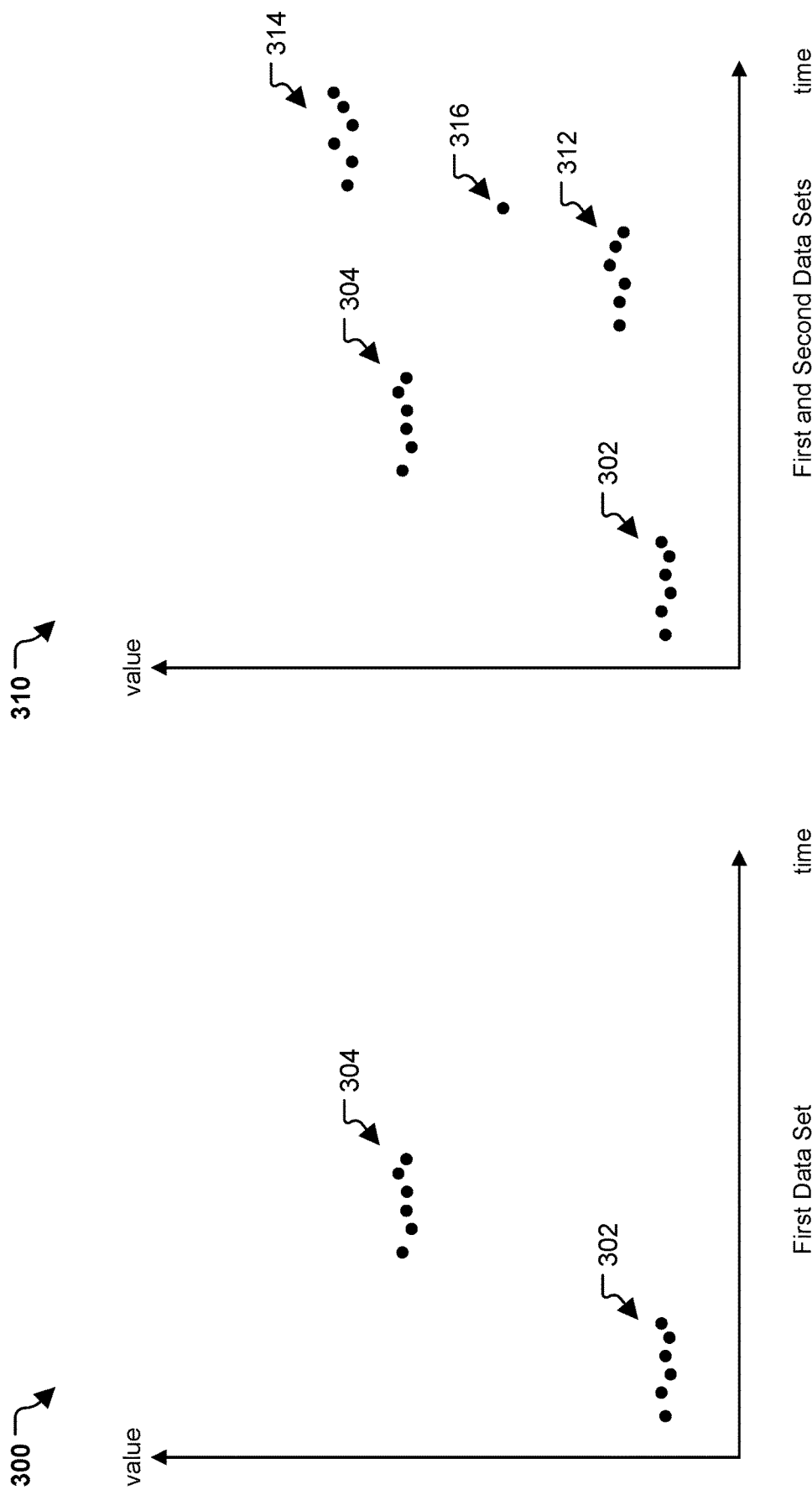
FIG. 3 illustrates clustering of time-series data in accordance with one or more aspects disclosed herein.

Referring to FIG. 3, particular illustrative examples of clustering time-series data are illustrated. Graph 300 illustrates a first data set of time-series data, such as the first data set 104 of FIGS. 1A and 1B. The first data set includes first data points 302 and second data points 304. Clustering operations are performed on the first data points 302 and the second data points 304 to group the data points into a first group of clusters, as described with reference to FIG. 2. For example, based on similarities of the first data points 302 (e.g., similarities in a feature space), the first data points 302 are grouped in a first cluster. Additionally, based on similarities of the second data points 304, the second data points 304 are grouped in a second cluster.

Each of the clusters is associated with a label, as described with reference to FIG. 2. For example, the first cluster is associated with a first label, and the second cluster is associated with a second label. The labels may correspond to operating states of a device being monitored, and may computer-generated or user-defined. The labels, the clusters, and the first data set are used to train a machine learning classifier, such as the first machine learning classifier 134 of FIG. 1A.

At a later time, a second data set is received, such as the second data set 105 of FIG. 1B. Graph 310 illustrates a combined data set (e.g., the first data set and the second data set). As illustrated in FIG. 3, an entirety of the first data set may be combined with the second data set to form the combined data set. Alternatively, less than an entirety of the first data set may be combined with the second data set to form the combined data set. The combined data set includes the first data points 302, the second data points 304, third data points 312, fourth data points 314, and a particular data point 316. Clustering operations are performed on the data points 302-304 and 312-316 to group the data points into a second group of clusters, as described with reference to FIG. 2. For example, based on similarities of the first data points 302 and the third data points 312, the first data points 302 and the third data points 312 are grouped into a third cluster. Additionally, based on similarities of the second data points 304 and the fourth data points 314, the second data points 304 and the fourth data points 314 are grouped into a fourth cluster. The particular data point 316 may be identified as an outlier. For example, a location of the particular data point 316 may be outside a threshold range of the locations of each cluster center.

Each of the clusters is associated with a label, as described with reference to FIG. 2. At least some of the labels are the same as the previously assigned labels. For example, the third cluster is associated with the first label based on the third cluster including the first data points 302 (or a subset thereof). Additionally, the fourth cluster is associated with the second label based on the fourth cluster including the second data points 304 (or a subset thereof). The particular data point 316 is associated with a third label. In a particular implementation, the third label is a fault state label. The labels, the clusters, and the combined data set are used to train a machine learning classifier, such as the second machine learning classifier 146 of FIG. 1B.

Because at least some of the second group of clusters are associated with labels that are also associated with the first group of clusters, the information (e.g., the labeled operating states) associated with earlier time periods is maintained when generating a new machine learning classifier (e.g., the second machine learning classifier 146). By associating at least some new clusters with labels of previous clusters, changing behavior patterns of complex assets can be learned by a machine learning classifier while retaining information (e.g., indicative of operating states) learned from historical data. This improves the utility of the machine learning classifier by reducing false positives of anomalous data as time goes on.

Figure 4:
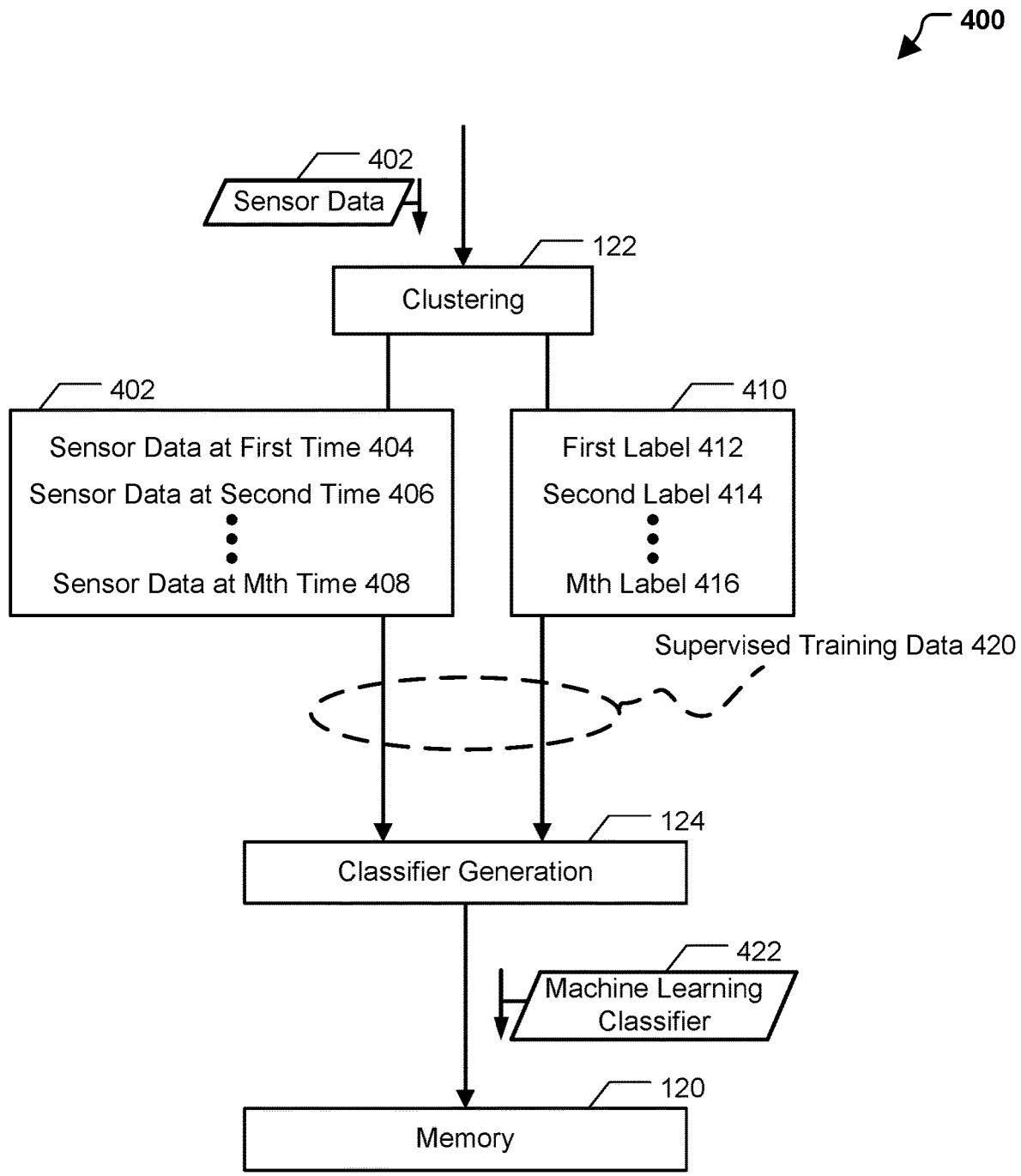
FIG. 4 illustrates a process for generating a machine learning classifier.

Referring to FIG. 4, illustrates a process 400 of generating a machine learning classifier. The process 400 may be performed by the computing device 110, such as by the processor 114 executing instructions stored at the memory 120.

The process 400 begins with receiving sensor data 402. The sensor data 402 may include the first data set 104 or the combined data set (e.g., a combination of the second data set 105 and at least a portion of the first data set 104). In a particular implementation, the sensor data 402 include vibration data, pressure data, temperature data, or a combination thereof, that is generated based on monitoring of a device, such as an industrial machine including a turbine, a compressor, or an engine. As further described herein, the sensor data 402 include sensor data at various times (e.g., sampled sensor data).

The sensor data 402 are provided to the clustering instructions 122 to cluster the sensor data 402 into a group of clusters. The clustering instructions 122 are configured to cluster the sensor data 402 into clusters based on relationships between particular elements of the sensor data 402, as further described with reference to FIG. 2. The clustering instructions 122 may be configured to perform centroid clustering operations (such as K-Means clustering), hierarchical clustering operations, mean-shift clustering operations, connectivity clustering operations, density clustering operations (such as DBSCAN), distribution clustering operations, EM clustering using GMMs, or other types of clustering operations or algorithms.

The clustering instructions 122 are also configured to associate the clusters with corresponding labels. The labels may be user-defined. After the clusters are labeled, each data point of the sensor data 402 is associated with a corresponding cluster label to generate label data 410. The label data 410 indicates a label associated with each element of the sensor data 402, and the label is based on the cluster that the element is assigned to. To illustrate, the sensor data 402 may include sensor data at a first time 404, sensor data at a second time 406, and sensor data at an Mth time 408. The label data 410 indicates a first label 412 associated with the sensor data at the first time 404, a second label 414 associated with the sensor data at the second time 406, and an Mth label 416 associated with the sensor data at the Mth time 408. Each label corresponds to a cluster that the element of the sensor data 402 is assigned to. For example, the sensor data at the first time 404 may be assigned to a particular cluster by the clustering instructions 122, and the first label 412 is the label associated with the particular cluster.

After the clustering operations and the labeling is performed, the sensor data 402 and the label data 410 are used as supervised training data 420. The supervised training data 420 are provided to the classifier generation instructions 124. The classifier generation instructions 124 generate a machine learning classifier 422, such as the first machine learning classifier 134 or the second machine learning classifier 146, based on the supervised training data 420. For example, the classifier generation instructions 124 may generate a neural network classifier, a decision tree classifier, a support vector machine classifier, a regression classifier, a naive Bayes classifier, a perceptron classifier, or another type of classifier. The supervised training data 420 may be used to train the machine learning classifier to output labels based on input data (e.g., time-series data) received by the machine learning classifier 422. For example, if the machine learning classifier 422 is a neural network classifier, the training may be performed using backpropagation or another training technique. The machine learning classifier 422 may be stored at the memory 120 for execution by the computing device 110 or for sending to another computing device.

In a particular implementation, the classifier generation instructions 124 are configured to use a first portion of the supervised training data 420 to train preliminary machine learning classifiers and, after training, to use a second portion of the supervised training data 420 to test performance of the preliminary machine learning classifiers. For example, the classifier generation instructions 124 may determine a performance metric or multiple performance metrics for each of the preliminary machine learning classifiers. The performance indicator or performance indicators may indicate values of the performance metrics. Additionally, or alternatively, the performance indicator or performance indicators may identify the best performing preliminary machine learning classifier of the preliminary machine learning classifiers. The best performing machine learning classifier may be selected based on classification accuracy, processing time, complexity, or other factors.

In a particular implementation, the classifier generation instructions 124 generate the machine learning classifier 422 by designating the best performing machine learning classifier as the machine learning classifier 422. In another particular implementation, the classifier generation instructions determine classifier generation settings associated with the best performing preliminary machine learning classifier to generate a new classifier, which is designated as the machine learning classifier 422. In this implementation, the preliminary machine learning classifiers are used to identify which type of machine learning classifier and which classifier generation settings work best for particular input data by dividing the supervised training data 420 into a training portion and a test portion. After identifying classifier parameters (e.g., a type of classifier and classifier generation settings) that work best for the particular input data, the classifier generation instructions 124 generate the machine learning classifier 422 using the classifier parameters and the entire set of the supervised training data 420. Thus, the machine learning classifier 422 may be trained using a larger set of supervised training data, which is expected to improve the accuracy of classifications assigned by the machine learning classifier 422.

Figure 5:
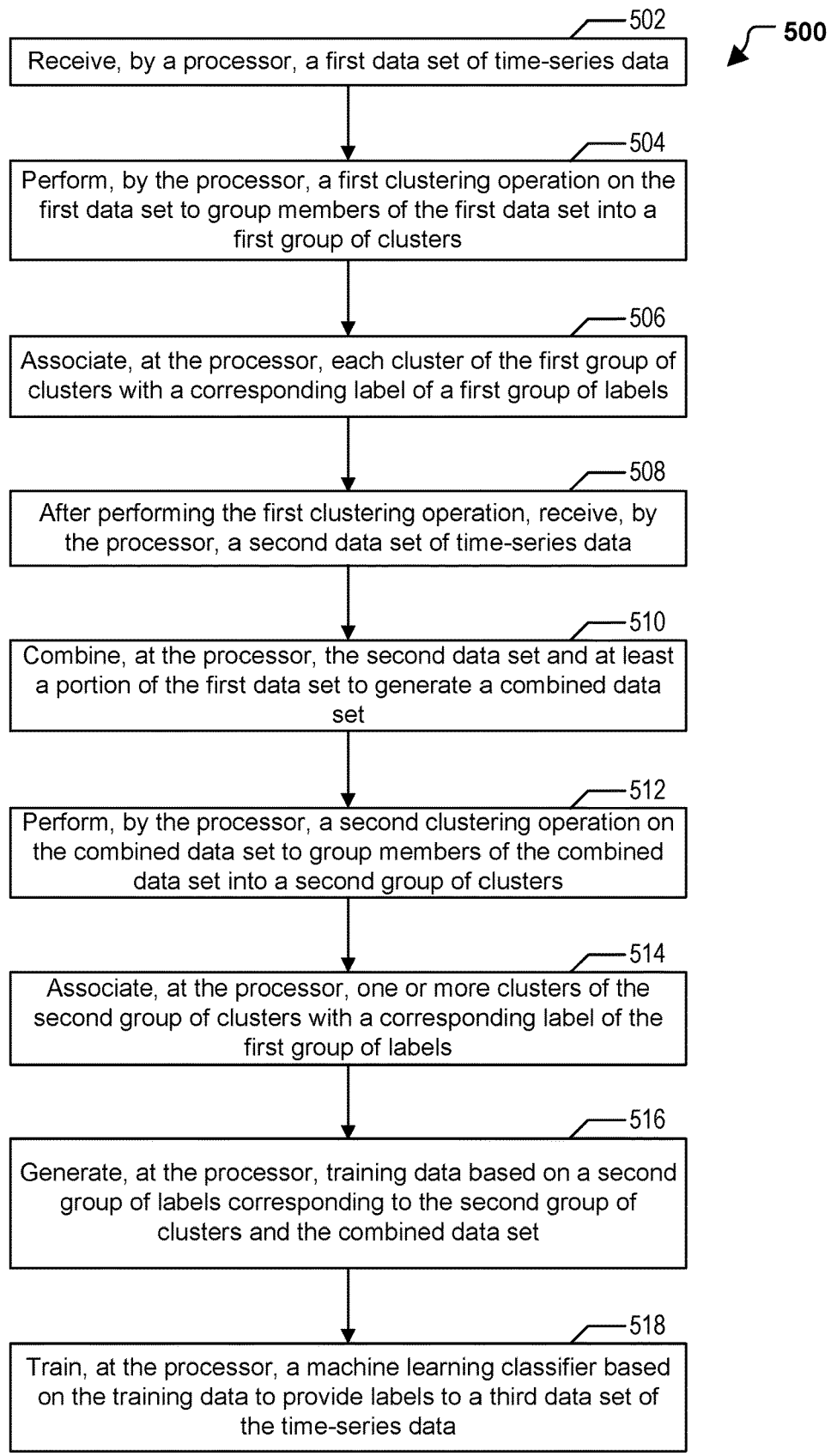
FIG. 5 is a flowchart to illustrate a particular embodiment of a method of operation at the system of FIG. 1.

Referring to FIG. 5, a particular example of a method 500 of operation of the system 100 is shown. The method 500 includes receiving, by a processor, a first data set of time-series data, at 502. For example, the processor 114 receives the first data set 104.

The method 500 includes performing, by the processor, a first clustering operation on the first data set to group members of the first data set into a first group of clusters, at 504. For example, the processor 114 performs a first clustering operation on the first data set 104 to group members of the first data set 104 into the first group of clusters 130.

The method 500 includes associating, at the processor, each cluster of the first group of clusters with a corresponding label of a first group of labels, at 506. For example, the processor 114 associates each cluster of the first group of clusters 130 with a corresponding label of the first group of labels 132.

The method 500 includes, after performing the first clustering operation, receiving, by the processor, a second set of the time-series data, at 508. For example, the processor 114 receives the second data set 105.

The method 500 includes combining, at the processor, the second data set and at least a portion of the first data set to generate a combined data set, at 510. For example, the processor 114 combines the second data set 105 and at least a portion of the first data set 104 to generate the combined data set.

The method 500 includes performing, by the processor, a second clustering operation on the combined data set to group members of the combined data set into a second group of clusters, at 512. For example, the processor 114 performs a second clustering operation on the combined data set (e.g., the second data set 105 and at least a portion of the first data set 104) to group members of the combined data set into the second group of clusters 142.

The method 500 includes associating, at the processor, one or more clusters of the second group of clusters with a corresponding label of the first group of labels, at 514. For example, the processor 114 associates one or more clusters of the second group of clusters 142 with a corresponding label of the first group of labels 132. To further illustrate, the second group of labels includes one or more of the first group of labels 132.

The method 500 includes generating, at the processor, training data based on a second group of labels corresponding to the second group of clusters and the combined data set, at 516. For example, the processor 114 generates the second training data 140 that is based on the combined data set, the second group of clusters 142, and the second group of labels 144.

The method 500 further includes training, at the processor, a machine learning classifier based on the training data to provide labels to a third data set of the time-series data, at 518. For example, the processor 114 trains the second machine learning classifier 146 based on the second training data 140 to provide labels to a third data set of the time-series data.

In a particular implementation, the first group of labels includes one or more user-defined labels describing an operating state associated with the time-series data. For example, the first group of labels 132 describes an operating state of a device, such as a machine, which the sensors 102 are performing measurements of Additionally, or alternatively, the method 500 further includes initiating display of a prompt for a label of a new cluster, and the second group of clusters includes the new cluster. For example, the display device 108 may display (e.g., via the GUI 109) a prompt for a label of a new cluster that is included in the second group of clusters 142, and the label may be indicated by the user input 106.

In a particular implementation, training the machine learning classifier includes training the machine learning classifier to detect an operating state of a device based on real-time, time-series data and to generate an output indicating a user-defined label describing the operating state, the user-defined label including a cluster label. To illustrate, in a particular implementation, the sensors 102 are coupled to a device and generate real-time, time-series data. In this implementation, the second machine learning classifier 146 is configured to generate labels associated with members of the real-time, time-series data. The labels may include a user-defined label as indicated by the user input 106.

In a particular implementation, the method 500 includes training a first machine learning classifier based on the first data set and the first group of labels to provide labels to input data. For example, the processor 114 trains the first machine learning classifier 134 based on the first training data 128. In some implementations, the method 500 further includes providing the second data set to the first machine learning classifier to generate one or more labels associated with the second data set. For example, the second data set 105 is provided to the first machine learning classifier 134 to generate one or more labels associated with the second data set 105. The one or more labels may also be included in the second group of labels 144, as further described with reference to FIG. 1B.

In a particular implementation, the first data set and the second data set include pressure measurements generated by one or more pressure sensors, vibration measurements generated by one or more vibration sensors, temperature measurements generated by one or more temperature sensors, or a combination thereof. For example, the sensors 102 may include pressure sensor, vibration sensors, temperature sensors, or a combination thereof.

In a particular implementation, a first cluster of the first group of clusters is associated with a first label of the first group of labels, a second cluster of the second group of clusters is associated with the first label, and a characteristic of the first cluster is different from a corresponding characteristic of the second cluster. For example, as described with reference to FIG. 2, the first cluster 202 and the fifth cluster 222 are associated with the same label (e.g., "Operating State A") even though certain characteristics (e.g., location of cluster center, quantity of members, cluster boundary, etc.) of the fifth cluster 222 is different from the corresponding characteristics of the first cluster 202.

In a particular implementation, a first label of the first group of labels is associated with a first cluster of the first group of clusters, the first cluster has a first center location in a feature space, and the first label is associated with a second cluster of the second group of clusters based on a center location in the feature space of the second cluster being within a threshold distance of the center location of the first cluster. For example, the first cluster 202 and the fifth cluster 222 may be associated with the same label (e.g., "Operating State A") based on the location of the cluster center 240 of the fifth cluster 222 being within a threshold distance of the location of the cluster center 210 of the first cluster 202.

In a particular implementation, a first label of the first group of labels is associated with a first cluster of the first group of clusters, the first cluster includes one or more particular members of the first data set, and the first label is associated with a second cluster of the second group of clusters based on the second cluster including the one or more particular members. For example, the first cluster 202 and the fifth cluster 222 may be associated with the same label (e.g., "Operating State A") based on the first cluster 202 and the fifth cluster 222 both including the data points A1, A2, and A3.

In a particular implementation, a first label of the first group of labels is associated with a first cluster of the first group of clusters, the first cluster includes a first quantity of members, and the first label is associated with a second cluster of the second group of clusters based on a difference between the first quantity and a second quantity of members included in the second cluster satisfying a threshold. For example, the first cluster 202 and the fifth cluster 222 may be associated with the same label (e.g., "Operating State A") based on a difference between the total number of data points (e.g., members) of the first cluster 202 and the total number of data points of the fifth cluster 222 being less than or equal to a threshold.

In a particular implementation, a first label of the first group of labels is associated with a first cluster of the first group of clusters, the first cluster is associated with a first distribution, and the first label is associated with a second cluster of the second group of clusters based on a difference between the first distribution and a second distribution associated with the second cluster satisfying a threshold. For example, the first cluster 202 and the fifth cluster 222 may be associated with the same label (e.g., "Operating State A") based on a difference between a first distribution associated with the first cluster 202 and a second distribution associated with the fifth cluster 222 being less than or equal to a threshold.

The method 500 enables generation and training of a machine learning classifier that maintains information associated with previous data (e.g., the first data set) while taking into account changes to a device being monitored. This improves the utility of the machine learning classifier by reducing false positives of anomalous data as time goes on.

It is to be understood that the division and ordering of steps described herein shown in the flowchart of FIG. 5 is for illustrative purposes only and is not be considered limiting. In alternative implementations, certain steps may be combined and other steps may be subdivided into multiple steps. Moreover, the ordering of steps may change.

In conjunction with the described aspects, a computing device includes a processor and a memory storing instructions executable by the processor to perform operations including receiving a first data set of time-series data. The operations include performing a first clustering operation on the first data set to group members of the first data set into a first group of clusters. The operations include associating each cluster of the first group of clusters with a corresponding label of a first group of labels. The operations include, after performing the first clustering operation, receiving a second data set of the time-series data. The operations include combining the second data set and at least a portion of the first data set to generate a combined data set. The operations include performing a second clustering operation on the combined data set to group members of the combined data set into a second group of clusters. The operations include associating one or more clusters of the second group of clusters with a corresponding label of the first group of labels. The operations include generating training data based on a second group of labels corresponding to the second group of clusters and the combined data set. The operations further include training a machine learning classifier based on the training data to provide labels to a third data set of the time-series data.

In a particular implementation, a first cluster of the first group of clusters is associated with a first label of the first group of labels, a second cluster of the second group of clusters is associated with the first label, and a characteristic of the first cluster is different from a corresponding characteristic of the second cluster. For example, a centroid of the first cluster in a feature space, a number of members included in the first cluster, or a distribution associated with the first cluster may be different from a centroid of the second cluster in the feature space, a number of members included in the second cluster, or a distribution associated with the second cluster, respectively. Additionally, or alternatively, the computing device may further include a display device configured to display a prompt for one or more user-defined labels corresponding to the second group of labels. In some implementations, the machine learning classifier is configured to detect an operating state of a device based on real-time, time-series data and to generate an output indicating the one or more user-defined labels describing the operating state. The display device is further configured to display the output. Additionally, or alternatively, the computing device further includes an input interface configured to receive a user input indicating the one or more user-defined labels.

In conjunction with the described aspects, a method includes receiving, by a processor, a first data set of time-series data. The method includes performing, by the processor, a first clustering operation on the first data set to group members of the first data set into a first group of clusters. The method includes associating, at the processor, each cluster of the first group of clusters with a corresponding label of a first group of labels. The method includes, after performing the first clustering operation, receiving, by the processor, a second data set of the time-series data. The method includes combining, at the processor, the second data set and at least a portion of the first data set to generate a combined data set. The method includes performing, by the processor, a second clustering operation on the combined data set to group members of the combined data set into a second group of clusters. The method includes associating, at the processor, one or more clusters of the second group of clusters with a corresponding label of the first group of labels. The method includes generating, at the processor, training data based on a second group of labels corresponding to the second group of clusters and the combined data set. The method further includes training, at the processor, a machine learning classifier based on the training data to provide labels to a third data set of the time-series data.

In conjunction with the described aspects, a computer-readable storage device stores instructions that, when executed, cause a computer to perform operations including receiving a first data set of time-series data. The operations include performing a first clustering operation on the first data set to group members of the first data set into a first group of clusters. The operations include associating each cluster of the first group of clusters with a corresponding label of a first group of labels. The operations include, after performing the first clustering operation, receiving a second data set of time-series data. The operations include combining the first data set and the second data set to generate a combined data set. The operations include performing a second clustering operation on the combined data set to group members of the combined data set into a second group of clusters. The operations include associating one or more clusters of the second group of clusters with a corresponding label of the first group of labels. The operations include generating training data based on a second group of labels corresponding to the second group of clusters and the combined data set. The operations further include training a machine learning classifier based on the training data to provide labels to a third data set of the time-series data.

In a particular implementation, the first data set and the second data set comprise pressure measurements generated by one or more pressure sensors, vibration measurements generated by one or more vibration sensors, temperature measurements generated by one or more temperature sensor, or a combination thereof. In some implementation, the first data set and the second data set are generated by sensors coupled to one or more turbines, one or more compressors, one or more oil rigs, or a combination thereof.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. Thus, also not shown in FIG. 1, the system 100 may be implemented using one or more computer hardware devices (which may be communicably coupled via local and/or wide-area networks) that include one or more processors, where the processor(s) execute software instructions corresponding to the various components of FIG. 1. Alternatively, one or more of the components of FIG. 1 may be implemented using a hardware device, such as a field-programmable gate array (FPGA) device, an application-specific integrated circuit (ASIC) device, etc. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagram and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of generating a machine learning classifier, the method comprising:
receiving, by a processor, a first data set of time-series data;
performing a first instance of a clustering operation on the first data set, including initializing a first set of cluster centers and assigning data points of the first data set to first clusters associated with the first set of cluster centers to generate a first group of clusters;
assigning a first group of labels to the first group of clusters, wherein the first group of labels includes one or more user-defined labels;
generating first labeled training data, wherein the first labeled training data associates each data point of the first data set with a respective one of the first group of labels based on a cluster to which the data point is assigned by the first instance of the clustering operation;
using the first labeled training data to train a first machine learning classifier to label a portion of the time-series data received subsequent to the first data set, the first machine learning classifier being trained to detect a first set of operating states of a device based on the time-series data, the first set of operating states indicated by the first group of labels;
after training the first machine learning classifier, receiving, by the processor, a second data set of the time-series data;
combining, at the processor, the second data set and a subset of the first data set to generate a combined data set based on a sliding time window;
performing, by the processor, a second instance of the clustering operation on the combined data set, including initializing a second set of cluster centers and assigning data points of the combined data set to second clusters associated with the second set of cluster centers to generate a second group of clusters;
associating, at the processor, one or more clusters of the second group of clusters with a corresponding label of the first group of labels, including assigning a label of a first cluster of the first group of clusters to a second cluster of the second group of clusters responsive to determining that a characteristic of the first cluster differs by less than a threshold from a corresponding characteristic of the second cluster;
generating, at the processor, second labeled training data based on the second group of clusters and labels associated with data points of the second data set; and
using the second labeled training data to train a second machine learning classifier to label a portion of the time-series data received subsequent to the second data set, wherein the second machine learning classifier corresponds to an updated version of the first machine learning classifier and is trained to detect and identify the first set of operating states and at least one second operating state of the device based on the time-series data, wherein the at least one second operating state is identified by one of the second group of labels and is different from the operating states of the first group of operating states.

2. The method of claim 1, wherein each of the data points of the first data set includes or corresponds to a vector of values representing multiple sensor readings during a particular time period.

3. The method of claim 1, further comprising, after the performing the second instance of the clustering operation:
identifying a third cluster of the second group of clusters based on the characteristic of the first cluster differing by more than the threshold from a corresponding characteristic of the third cluster; and
responsive to identifying the third cluster, initiating display of a prompt for a user-defined label of the third cluster of the second group of clusters.

4. The method of claim 1, further comprising:
during a first period of time, processing sensor data using the first machine learning classifier to identify operating states of a device, the operating states identified by the first group of labels; and
after the first period of time:
performing the second instance of the clustering operation, the associating the one or more clusters of the second group of clusters with the corresponding label of the first group of labels, the generating the second labeled training data, and the training the second machine learning classifier; and
during a second period of time, processing sensor data using the second machine learning classifier to identify the operating states of the device.

5. The method of claim 1, wherein the processor includes one or more processors, one or more central processing units (CPUs), one or more graphics processing units (GPUs), one or more controllers, or a combination thereof.

6. The method of claim 1, wherein the characteristic of the first cluster indicates a center location of the first cluster, and wherein the characteristic of the second cluster indicates a center location of the second cluster, and the threshold includes a threshold distance between center locations.

7. The method of claim 1, wherein the performing the first instance of the clustering operation includes performing a first randomized selection of cluster centers of the first group of clusters, and wherein the performing the second instance of the clustering operation includes performing a second randomized selection of cluster centers of the second group of clusters.

8. The method of claim 1, wherein the characteristic of the first cluster indicates a first quantity of data points assigned to the first cluster, wherein the characteristic of the second cluster indicates a second quantity of data points assigned to the second cluster, and wherein the threshold includes a threshold difference between the first quantity and a second quantity.

9. The method of claim 1, wherein the characteristic of the first cluster indicates a first distribution of data points of the first cluster, wherein the characteristic of the second cluster indicates a second distribution of data points of the second cluster, and wherein the threshold includes a threshold difference between the first distribution and a second distribution.

10. A computing device comprising:
a processor; and
a memory coupled to the processor and storing instructions executable by the processor to perform operations comprising:
clustering a first data set, including initializing a first set of cluster centers and assigning data points of the first data set to first clusters associated with the first set of cluster centers to generate a first group of clusters;

receiving user input specifying a user-defined label for at least one cluster of the first group of clusters;

generating first labeled training data based on the first data set and the first group of clusters, wherein the first labeled training data associate the data points of the first data set with corresponding labels of a first group of labels based on a cluster to which each of the data points is assigned;

training a first machine learning classifier using the first labeled training data, the first machine learning classifier being configured to detect a first set of operating states of a device based on real-time time-series data, the first set of operating states indicated by the first group of labels;

generating a combined data set using a sliding time window, the combined data set including a subset of the first data set and a second data set;

clustering the combined data set, including initializing a second set of cluster centers and assigning data points of the combined data set to second clusters associated with the second set of cluster centers to generate a second group of clusters;

assigning a second group of labels to the second group of clusters, the second group of labels assigned based, at least in part, on comparisons of characteristics of clusters of the first group of clusters and characteristics of clusters of the second group of clusters, the second group of labels containing at least one label from the first group of labels;

generating second labeled training data based on the data points of the combined data set, the second group of clusters, and the second group of labels; and training a second machine learning classifier using the second labeled training data, wherein the second machine learning classifier corresponds to an updated version of the first machine learning classifier and is trained to detect and identify the first set of operating states and at least one second operating state of the device based on the time-series data, wherein the at least one second operating state is identified by one of the second group of labels and is different from the operating states of the first group of operating states.

11. The computing device of claim 10, wherein a first user-defined label is associated with a first cluster of the first group of clusters, wherein the first cluster includes one or more particular data points of the first data set, and wherein assigning the second group of labels to the second group of clusters includes assigning the first user-defined label to a second cluster of the second group of clusters based on the second cluster including the one or more particular data points.

12. The computing device of claim 10, further comprising a display device configured to display a prompt for the user-defined label.

13. The computing device of claim 10, wherein the first set of cluster centers are initialized via a first randomized selection of cluster centers based on the first data set, and wherein the second set of cluster centers are initialized via a second randomized selection of cluster centers based on the combined data set.

14. A computer-readable storage device storing instructions that, when executed by a processor, cause the processor to perform operations comprising:

clustering a first data set, including initializing a first set of cluster centers and assigning data points of the first data set to first clusters associated with the first set of cluster centers to generate a first group of clusters;

receiving user input specifying a user-defined label for at least one cluster of the first group of clusters;

generating first labeled training data based on the first data set and the first group of clusters, wherein the first labeled training data associate the data points of the first data set with corresponding labels of a first group of labels based on a cluster to which each of the data points is assigned;

training a first machine learning classifier using the first labeled training data, the first machine learning classifier being configured to detect a first set of operating states of a device based on real-time time-series data, the first set of operating states indicated by the first group of labels;

after training the first machine learning classifier and in response to a determination to generate a new or updated machine learning classifier to account for changes associated with the device or a sensor:

generating a combined data set using a sliding time window, the combined data set including a subset of the first data set and a second data set of unlabeled data points of time series data;

clustering data points of the combined data set, including initializing a second set of cluster centers and assigning the data points of the combined data set to second clusters associated with the second set of cluster centers to generate a second group of clusters;

assigning a second group of labels to the second group of clusters, the second group of labels assigned based, at least in part, on comparisons of characteristics of clusters of the first group of clusters and characteristics of clusters of the second group of clusters, the second group of labels containing at least one label from the first group of labels;

generating second labeled training data including the data points of the combined data set and the second group of labels; and training a second machine learning classifier using the second labeled training data, wherein the second machine learning classifier corresponds to an updated version of the first machine learning classifier and is trained to detect and identify the first set of operating states and at least one second operating state of the device based on the time-series data, wherein the at least one second operating state is identified by one of the second group of labels and is different from the operating states of the first group of operating states.

15. The computer-readable storage device of claim 14, wherein the first data set and the second data set comprise pressure measurements generated by one or more pressure sensors associated with the device, vibration measurements generated by one or more vibration sensors associated with the device, temperature measurements generated by one or more temperature sensors associated with the device, or a combination thereof.

16. The computer-readable storage device of claim 15, wherein the device includes one or more turbines, one or more compressors, one or more oil rigs, or a combination thereof.

* * * * *